Figure 1:
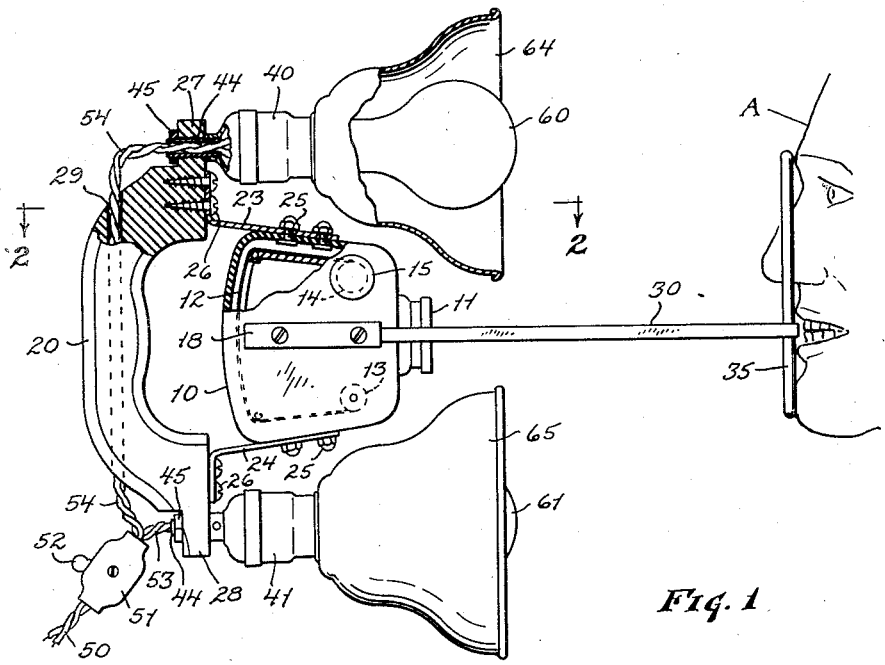

June 15, 1943.    A. J. KUNZE    2,322,032
PHOTOGRAPHIC APPARATUS
Filed Aug. 3, 1940    2 Sheets-Sheet 1

INVENTOR.
Albert J. Kunze
BY Bates, Teare & McBean
ATTORNEYS.

June 15, 1943.  A. J. KUNZE  2,322,032
PHOTOGRAPHIC APPARATUS
Filed Aug. 3, 1940  2 Sheets-Sheet 2

INVENTOR.
Albert J. Kunze
BY Bates, Teare & McBean,
ATTORNEYS.

Patented June 15, 1943

2,322,032

UNITED STATES PATENT OFFICE 2,322,032

PHOTOGRAPHIC APPARATUS

Albert J. Kunze, Cleveland, Ohio

Application August 3, 1940, Serial No. 350,553

4 Claims. (Cl. 240—2)

This invention relates to a camera provided with a positioning device adapted to engage the subject to be photographed, so that the picture will be on a definite scale with reference to the original; also a succession of pictures may be taken all on the same scale. Combined with the camera is means for illuminating the subject, allowing the picture to be taken indoors.

My combined camera and illuminating device is adapted for various uses. For example, it may be advantageously employed in making dental records, by taking a succession of photographs of the patient's mouth or teeth in various positions; the device may be used to advantage by surgeons in making photographs of wounds at different times to indicate the healing progress; the device may be used for recording successive operations of a machine or for making scale reproductions of drawings, etc. The mention of these uses is not to be taken as a limitation, but merely as an illustration of the wide variety of uses.

The present invention is in the nature of an improvement on the camera shown in my prior patent, No. 2,185,508, issued January 2, 1940. The improvement simplifies and cheapens the apparatus, renders it more efficient, provides for a more effective illumination of the subject, and for more readily handling by the user.

The invention is illustrated in a preferred form in the drawings hereof, and is hereinafter more fully described and the essential novel features are summarized in the claims.

Figure 2:
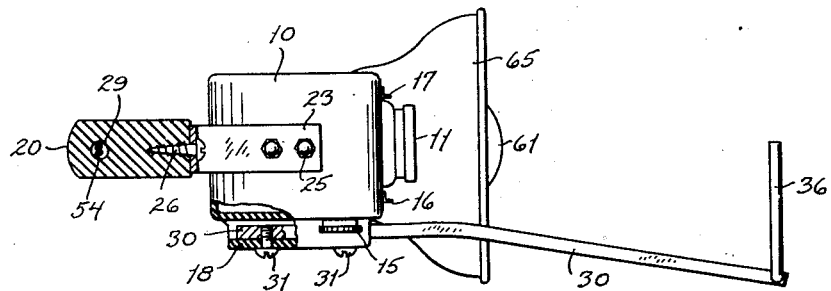
Figure 3:
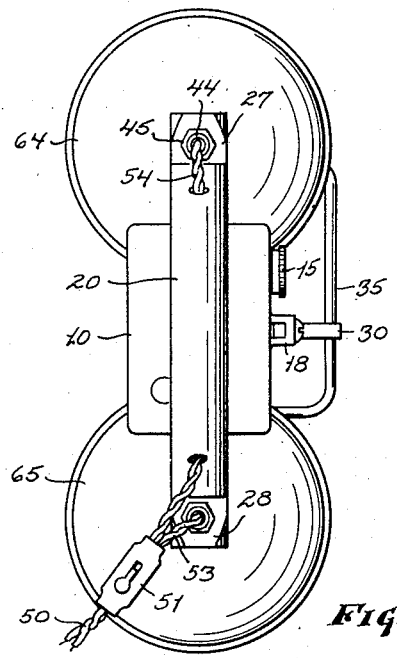
Figure 4:
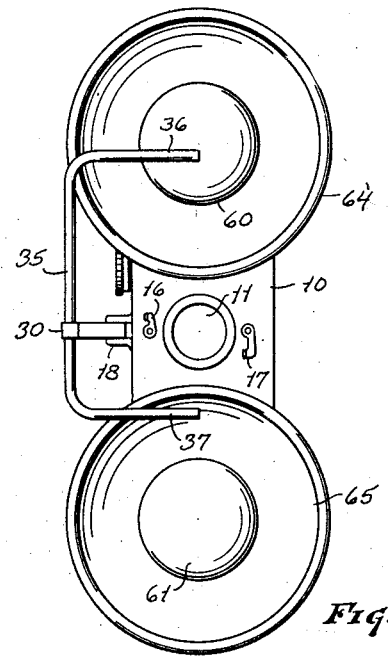
Figure 5:
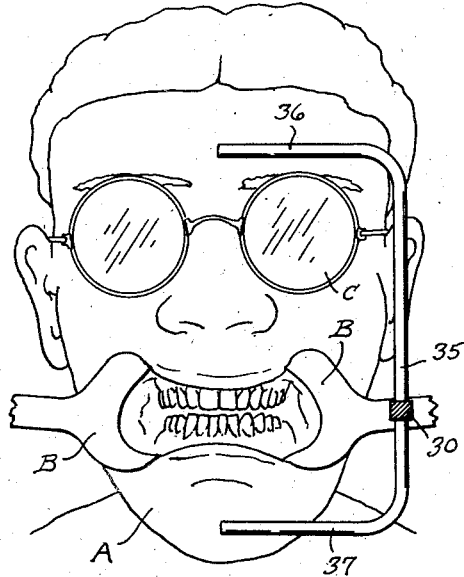
Figure 6:
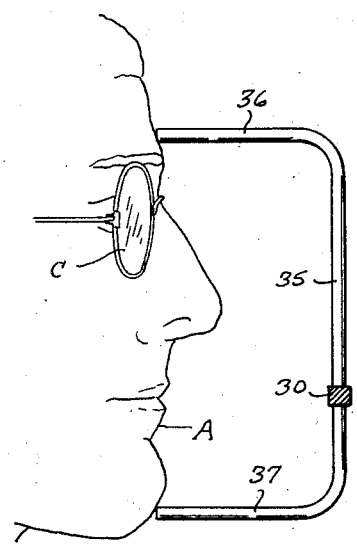

In the drawings, Fig. 1 is a sectional side elevation of my combined camera and illuminating device; Fig. 2 is a sectional plan thereof, the plane of the section being approximately that indicated by the line 2—2 in Fig. 1; Fig. 3 is a rear elevation; Fig. 4 is a front elevation; Figs. 5 and 6 are elevations illustrating the use of the camera in taking a face view and a profile of a subject respectively.

As shown in Figs. 1 to 4 inclusive, 10 indicates a suitable camera box provided with a lens 11 and with means for positioning a sensitized film 12 within the box at a suitable distance behind the lens. The ends of this film are wound on suitable rollers indicated at 13 and 14, the roller 14 having a suitable knob 15 by which the film may be moved subsequent to the making of each picture.

The camera is shown as having a control lever 16 to set it for a time exposure or for instantaneous operation and with a shutter lever 17. It will be understood that the camera box has suitable means by which it may be opened, a suitable movable side for instance, whereby the film may be installed.

As illustrated, the camera box has flat sides, a curved back, inclined top and bottom, and a flat front face carrying the lens, this being a very satisfactory shape of camera box which is on the market. However, I do not limit myself to that particular shape.

In the drawings, 20 indicates a suitable handle adapted to be grasped by the operator. This handle may be made of any proper material, preferably some insulating substance. The handle is secured to the camera box by two clips 23 and 24 which are shown as bolted at 25 to the camera box and as secured by screws 26 to the handle.

Formed on one side of the camera box is a suitable tubular extension 18 parallel with the axis. This extension having a square bore is provided on existing cameras on the market for use as a finder, but in my invention I use it for an entirely different purpose, as I will now describe.

Mounted in the extension 18 is a square bar 30 secured to the extension by screws 31. At the forward end of the longitudinal bar 30 is a bar 35 which is bent at its end to provide spaced lateral parallel extensions 36 and 37. The extensions 36 and 37 are adapted to engage the subject to be photographed and operate to maintain the lens at a constant distance from the subject without interfering with the picture.

To illuminate the subject being photographed, I provide a pair of electric sockets 40 and 41 secured to extensions 27 and 28 of the handle. As shown, each socket, which is of ordinary standard electric lamp type, has mounted in its end a sleeve 44 which extends through the corresponding extension of the handle and receives on the rear side of such extension a clamp nut 45. Double electric cords pass through these two sleeves into the sockets and are secured to the terminals thereof as will be well understood.

I have shown in Fig. 1, at 50, a double-conductor cord leading from a suitable source (not shown) to a controlling switch 51 of usual type. From this switch, two double cords 53 and 54 lead to the respective sockets. One of these double cords, as 53, passes directly through the adjacent tube 44 to the lower socket 41. The other double cord, 54, passes through a longitudinal opening 29 in the handle and then to the other tube 44 into the socket 40. The two sockets 40 and 41 carry two electric lamps 60 and 61 of comparatively high power, and carry also reflectors 64 and 65 facing in the general direction toward the subject to be photographed.

In using the apparatus, the operator grasps it by one hand on the intermediate region of the handle and places the transverse position rods 36 and 37 in engagement with the subject— either the sides of the rods as shown in Fig. 5 or the extreme end as shown in Fig. 6. As shown in Fig. 1 or Fig. 5, the operator is taking a front view of a human face indicated at A or the desired portion thereof. In such case my device is held in a vertical plane; that is, with one lamp above the camera and one below it, the rods 36 and 37 contacting with the forehead and chin of the subject. The operator, with his other hand, then throws the handle 52 of the switch 51 to illuminate the lamps, and then operates the shutter lever 17. Thereby he obtains a photograph of the subject at a definite scale.

I find it very convenient to make the positioning bar 30 of such length that the subject is at a distance from the lens twice the focal distance of the lens to the film. Accordingly, the picture is exactly half size. This is the embodiment shown in Fig. 1. However, other lengths of bar may be employed if desired.

Having taken a definite size picture of the subject as shown in Fig. 1 (the picture in this case being a full face view), the operator may take a profile view of the same subject on the same scale, as illustrated in Fig. 6, the extreme ends of the transverse bars 36 and 37 in this case touching the face of the subject.

In Fig. 5, I have illustrated the use of the camera in making a dental record, the lips and mouth being spread in this instance by means of suitable clamps or tapes indicated at B to expose the teeth and the end of the positioning bar engaging the forehead and chin of the subject. As the electric lamps provide an intense illumination, I prefer to protect the eyes of the subject by means of dark glasses, indicated at C.

It will be seen that with my apparatus, I can take a succession of pictures of the same subject, all on the same scale and that such scale may bear a definite relation to the size of the subject. Thus, for instance, I may make dental records showing various characteristics of the subject's countenance or teeth in different positions, all for instance, one-half the size of the original. Such pictures are a great aid to a dentist in making false teeth which will not change the user's appearance. My camera is also of great use in taking successive pictures of any subject which changes from time to time so that a record may be kept at the rate of growth or change, and various other uses that will be readily apparent.

I claim:

1. The combination of a camera having a box, a lens on the forward face thereof, means within the box for carrying the film, a transverse handle having an intermediate grip portion, a pair of clips securing the box to the handle adjacent opposite ends of the grip portion, a pair of electric lamp sockets secured to the handle beyond the respective clips, and a pair of reflectors associated with the respective sockets, whereby light from lamps in the sockets may be reflected toward a subject in front of the camera.

2. The combination of a camera, a handle having an intermediate grip portion, means securing the handle to the camera in regions respectively beyond the grip portion, a pair of electric lamp sockets secured to the handle beyond its attachment to the camera, a pair of reflectors associated with the respective sockets whereby light from lamps in the sockets may be reflected upon a subject in front of the camera, said handle having a passageway through it from the vicinity of one socket to the vicinity of the other, an electric supply cord with two conductors, said conductors dividing adjacent one end of the handle and providing two double cords, one passing directly to one socket and the other passing through the opening of the handle to the other socket.

3. The combination of a camera, having a lens on its forward face and means within the camera for carrying the film, an illuminating device, a reflector for directing light from the illuminating device onto a subject in front of the camera, a handle carrying the camera and the illuminating device and reflector, a housing secured to one side of the camera, and a spacing rod entering the housing and extending forwardly therefrom.

4. In a portable photographic apparatus, the combination of a camera having a substantially closed box, a lens at the front of the box, means within the box for holding sensitized film, a pair of angle clips secured respectively to opposite walls of the camera and extending rearwardly therefrom and flanged at their ends into a transverse plane, a handle having an intermediate grip portion and having forward faces at the ends of the grip portion to which the flanges of the clips are secured, said handle projecting beyond the flanges of said clips, electric lamp sockets secured to such projecting portions of the handle, and a pair of reflectors associated with the respective sockets and adapted to direct light from lamps in the sockets onto a subject in front of the camera.

ALBERT J. KUNZE.